CARL H. KOONZ
ELDON J. STRANDINE
INVENTORS.

BY E.T. McCabe

ATTORNEY

United States Patent Office 3,623,892
Patented Nov. 30, 1971

3,623,892
METHOD OF PREPARING A FROZEN FOWL PRODUCT
Carl H. Koonz, Downers Grove, and Eldon J. Strandine, Chicago, Ill., assignors to Swift & Company, Chicago, Ill.
Continuation-in-part of application Ser. No. 602,709, Dec. 19, 1966. This application Aug. 11, 1969, Ser. No. 871,394
Int. Cl. A22c 21/00; A23b 1/06
U.S. Cl. 99—194
9 Claims

ABSTRACT OF THE DISCLOSURE

A frozen poultry product is prepared in a manner which enables easy access to the body cavity of the poultry without the necessity of defrosting. The posterior opening of an eviscerated fowl is maintained in a dilated position by inserting a tube therein, which tube may contain giblets, and through which the fowl cavity may be stuffed.

---

This application is a continuation-in-part application of U.S. Ser. No. 602,709, filed Dec. 19, 1966, now abandoned.

Generally, the present invention relates to an improvement in the art of poultry packaging, and more specifically, to a method of packaging frozen non-disjointed poultry in a manner which will permit ready access to the body cavity of the fowl without the necessity of defrosting. The present invention also relates to the frozen poultry product prepared by the aforesaid method.

In this era of modern packaging and convenience foods, the frozen fowl is almost unique in the time required for its preparation. Consequently, frozen turkey consumption, for example, has been generally limited to special occasions such as holidays. The primary drawback to consumer preparation of frozen fowl for consumption is the extensive thawing time required, prior to cooking, in order to render the flesh sufficiently flaccid for removal of the neck and/or giblets which are normally packaged within the body cavity of the frozen eviscerated fowl. These parts must be removed from the body cavity to permit the insertion of stuffing therein. Also, the consumer may wish to use the giblets in preparing the stuffing or a giblet gravy. But since the usual frozen fowl has the opening to the body cavity frozen in a closed position, and since the neck and/or giblets are usually frozen to the cavity wall, it has been necessary to first thaw the fowl in order to gain access to the fowl cavity to remove the giblets and/or neck therefrom.

Concomitant with the thawing that heretofore has been necessary, bacterial growth begins to occur at temperatures above freezing, and if the fowl is maintained in a thawed state too long bacterial growth may become excessive. However if the fowl could be cooked directly from the frozen state bacterial growth could be minimized.

It is accordingly an object of the present invention to provide an improved packaged frozen fowl.

It is another object of the present invention to provide a packaged frozen fowl having a dilated cavity opening through which giblets and/or a neck can be removed and stuffing inserted without the necessity of thawing the fowl.

It is a further object of the present invention to provide a method of preparing a frozen poultry product having a dilated posterior opening, thus enabling easy access to the body cavity.

It is another object of this invention to provide a ready-to-roast poultry product which may be cooked without thawing.

It is a further object of this invention to provide a frozen poultry product which can be thawed in a substantially shorter period of time than prior art frozen poultry products.

Other objects of the present invention, if not specifically set forth herein, will be readily apparent to one skilled in the art from a reading of the following specification and claims.

Figure 1:
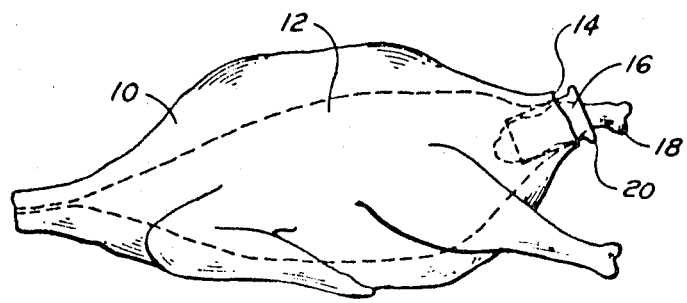

The present invention is illustrated by way of example in the accompanying drawings in which:
FIG. 1 is a profile view of one embodiment of a poultry product in accordance with the present invention; and
FIG. 2 is a profile view of a second embodiment of a poultry product in accordance with the present invention.

In the embodiment of the invention illustrated in FIG. 1, an eviscerated non-dismembered fowl 10 with a cleaned body cavity 12 has a posterior opening 14 maintained in a dilated position by a tubular member inserted therein. The tubular member 16 extends only partially into the body cavity 12, but is of sufficient length to retain its position once inserted in the posterior opening 12 of the fowl 10 at the packing house. Also, the tubular member 16 preferably is of sufficient length and diameter to contain a bag of giblets 18 and/or a neck, and the diameter thereof should be sufficient to facilitate access through the posterior opening 14 into the cavity 12. It will be observed from FIG. 1 that since the tubular member 16 extends only partially into the fowl cavity 12, member 16 does not substantially interfere with the filling of stuffing into the cavity 12.

In preparing the present poultry product for consumption, the housewife merely removes the giblet bag 18 from the tubular member 16, if such bag is present, and then forces stuffing through the tubular member 16 and into the fowl cavity 12. In view of the small size of the giblets, they can be quickly thawed and used in preparing the stuffing. The fowl 10 may then be cooked with or without removal of the tubular member 16. When said member is retained within the fowl during cooking, the removal of stuffing from the fowl cavity 12 subsequent to cooking is facilitated.

Figure 2:
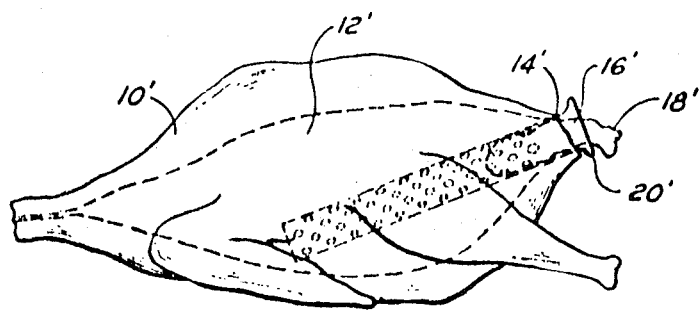

In the embodiment of the invention illustrated in FIG. 2, wherein parts similar to those shown in FIG. 1 are designated by the same reference characters bearing an exponent, an eviscerated fowl 10′ with a cleaned body cavity 12′ has a posterior opening 14′ maintained in a dilated position by means of a tubular member 16′ inserted therein. It will be observed from FIG. 2 that tubular member 16′ extends substantially the entire length of the fowl cavity 12′, terminating at the anterior portion of the cavity 12′. The tubular member 16′ disclosed in this embodiment may be either open or closed at the end disposed within the fowl cavity 12′. Preferably, the side walls of tube 16′ are perforated in order to allow an aroma interchange between the poultry meat and stuffing which may be contained within the member 16′.

In preparing the poultry product for consumption, the housewife removes the giblet bag 18′ and/or neck from the tubular member 16′ and thereafter inserts stuffing within the tubular member 16′. The fowl is then cooked with the perforated member 16′ being retained within the body cavity 12′. After cooking, the stuffing may readily be spooned from the tubular container, or in the alternative, the stuffing-containing tube can be withdrawn from the fowl cavity.

As will be observed from FIGS. 1 and 2, tubular members 16 and 16′ will preferably have an outwardly extending flange 20, 20′, respectively, disposed on the end of member 16, 16′ extending out of cavity 12, 12′. This flange functions to prevent further movement of the tubular member into the fowl cavity. While not necessary, a cap or cover member (not shown) may be fitted over the flange, if desired. Preferably, the surface of the tube will be smooth and moisture resistant in order to prevent the tube from adhering tightly to the poultry flesh when the product is frozen.

As hereinbefore noted, the length of the tubular member can vary. The diameter of the tube can also vary, and although a cylindrical shape is preferred, the tube can possess other configurations, such as a conical shape. The tube diameter at the potserior opening of the fowl, however, should be sufficient to fill said opening.

Various materials may be used in preparing the tubular members. The tube material should possess sufficient rigidity to maintain the posterior opening of the fowl in a dilated position upon freezing, and to prevent the posterior opening from collapsing during any vacuum packaging steps. Also, when the tubular member is to be retained within the fowl cavity during cooking, it is important that the tube material be able to withstand cooking temperatures without deformation of the tube. Material such as tin, aluminum, stainless steel, polypropylene, and various other plastics which have melting points greater than about 450° F. such that they will withstand normal cooking temperatures of 350–450° F. are suitable for this purpose. Finally, it is important that the material utilized in forming the tube be compatible with the poultry flesh, in order to insure that the product will not be adversely affected by the material either during cooking or while frozen.

A further novel advantage of the present frozen poultry product is that, if desired, it can be thawed in substantially less time than frozen fowls known in the prior art. The tubular member inserted in the posterior opening of the fowl and extending into the fowl cavity can be utilized as a channel for warm water or air. Therefore, the frozen product can be given a two-way thaw, both from the inside and from the outside. This enables the housewife to rapidly defrost the frozen product and thus substantially reduce the lengthy thawing time which has characterized the thawing of frozen poultry products in the past.

Referring now to the method of producing a poultry product as contemplated by the present invention, a fowl, such as a turkey, is dispatched, eviscerated, and dressed in a conventional manner. As is well known in the art, conventional evisceration techniques require the making of an incision at the posterior end of the fowl in order to provide an opening through which the fowl may be eviscerated. This opening is generally a vertical incision located above (toward the breastbone) the fowl's cloacal area, although a transverse incision, such as an incision known as a "bar cut" often made in turkey carcasses, or any other convenient incision, could also be utilized.

Subsequent to evisceration of the fowl, a tubular member of a type previously described, is inserted within this posterior opening such that said tubular member extends at least partially into the body cavity of the fowl. Thereafter, a bag of giblets may be placed within the tube. Generally, the giblets inserted within the tube-containing fowl will be those giblets removed from the same fowl during evisceration. Also, the neck, whether in a bag or not, may be positioned within the tubular member, either alone or in combination with the giblets.

Finally, the poultry product is frozen and packaged in a conventional manner. The eviscerated poultry product may be overwrapped with a suitable film, bag, netting, or the like, for protection and handling. Preferably, the poultry product is vacuum packaged in a suitable film such as a Cry-o-Vac bag. The film can then be heat-shrunk around the product. If the product is vacuum packaged before the fowl is completely frozen, the presence of the tubular member inserted within the posterior opening will prevent this opening from collapsing when a vacuum is drawn.

Although the foregoing description has been primarily in relation to the treatment of turkeys, it will be apparent that the invention is also applicable to other fowl, such as chickens, ducks, geese, pheasants, etc.

While the present invention has been described in reference to specific embodiments, it will be obvious to one skilled in the art that many modifications and variations of the invention as hereinbefore set forth may be made without departing from the spirit and scope thereof and, therefore, only such limitations should be imposed as are indicated in the appended claims.

We claim:
1. An improved method of preparing a frozen fowl product, comprising: eviscerating a fowl, inserting a tubular member at least partially into the body cavity of said fowl through the posterior opening thereof, placing a bag of giblets and/or a neck within said tubular member, and thereafter freezing said fowl.

2. The method of claim 1 wherein the posterior opening is an incision made above the cloacal area of the fowl, and the tubular member has sufficient rigidity to retain the posterior opening of said fowl in a dilated position upon freezing.

3. The method of claim 1 wherein said fowl is a turkey.

4. An eviscerated, frozen fowl having a tube inserted within the posterior end thereof, said tube having sufficient rigidity to retain the posterior opening of said fowl in a dilated position upon freezing, and a container of giblets and/or a neck positioned within said tube, whereby said giblets and/or neck may be removed through said tube while the fowl remains frozen.

5. The product of claim 4 wherein said tube is open at both ends thereof and extends only partially within the cavity of said eviscerated fowl.

6. The product of claim 4 wherein said tube is closed at the interior end and open at the exterior end and extends substantially the entire length of the fowl cavity, said tube being perforated.

7. The product of claim 4 wherein said tube is formed of a material selected from the group consisting of tin, aluminum, stainless steel, polypropylene, and plastics having a melting point greater than about 450° F.

8. The product of claim 4 wherein said tube has an outwardly extending flange at the outer end thereof.

9. The product of claim 4 wherein said fowl is a turkey.

References Cited
UNITED STATES PATENTS

| | | | |
|---|---|---|---|
| 2,314,317 | 3/1943 | Walter | 99—194 X |
| 3,366,491 | 1/1968 | Schwall et al. | 99—107 |
| 3,255,017 | 6/1966 | Leaver | 99—107 |
| 3,307,955 | 3/1967 | Pirtle | 99—107 |

HYMAN LORD, Primary Examiner

U.S. Cl. X.R.
17—11; 99—107